United States Patent
Ogasawara

(10) Patent No.: US 10,160,319 B2
(45) Date of Patent: Dec. 25, 2018

(54) VEHICLE DISPLAY PROCESSING APPARATUS

(71) Applicant: DENSO CORPORATION, Kariya, Aichi-pref. (JP)

(72) Inventor: Akihiro Ogasawara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 239 days.

(21) Appl. No.: 15/023,583

(22) PCT Filed: Sep. 17, 2014

(86) PCT No.: PCT/JP2014/004764
§ 371 (c)(1),
(2) Date: Mar. 21, 2016

(87) PCT Pub. No.: WO2015/045326
PCT Pub. Date: Apr. 2, 2015

(65) Prior Publication Data
US 2016/0207399 A1    Jul. 21, 2016

(30) Foreign Application Priority Data
Sep. 24, 2013  (JP) .................. 2013-197105

(51) Int. Cl.
*B60K 35/00*  (2006.01)
*G06F 3/01*  (2006.01)
(Continued)

(52) U.S. Cl.
CPC ............... *B60K 35/00* (2013.01); *G06F 3/01* (2013.01); *G06F 3/0412* (2013.01); *G06F 3/167* (2013.01);
(Continued)

(58) Field of Classification Search
CPC .... G06T 11/00; G60K 35/00; G60K 2350/90; G60K 2350/901; G60K 2350/906;
(Continued)

(56) References Cited

U.S. PATENT DOCUMENTS

2002/0032518 A1    3/2002   Okamoto et al.
2006/0015219 A1*   1/2006   Kynast ................... G01C 21/26
                                                                    701/1
(Continued)

FOREIGN PATENT DOCUMENTS

JP    H09159468 A    6/1997
JP    H10275542 A    10/1998
(Continued)

OTHER PUBLICATIONS

International Search Report and Written Opinion (in Japanese with English Translation) for PCT/JP2014/004764, dated Dec. 16, 2014; ISA/JP.

*Primary Examiner* — Ke Xiao
*Assistant Examiner* — Andrew Shin
(74) *Attorney, Agent, or Firm* — Harness, Dickey & Pierce, P.L.C.

(57) ABSTRACT

A vehicle display processing apparatus includes: a first determination portion that determines whether a vehicle is at a stop; a first display processing portion that displays on a first display device, an operation screen image, the first display device being provided between a driver seat and a front passenger seat; a second display processing portion that displays a screen image relating to the operation screen image, which is displayed on the first display device, on a second display device provided to a driver seat side; and a second determination portion that determines whether a running speed of the vehicle is equal to or greater than a predetermined speed. The second display device is provided by a head-up display. When the running speed of the vehicle is lower than the predetermined speed, the second display processing portion does not display the screen image on the second display device.

16 Claims, 5 Drawing Sheets

(51) Int. Cl.
*G06F 3/041* (2006.01)
*G06F 3/16* (2006.01)
*G01C 21/36* (2006.01)

(52) U.S. Cl.
CPC .. *B60K 2350/901* (2013.01); *B60K 2350/967* (2013.01); *G01C 21/36* (2013.01)

(58) Field of Classification Search
CPC ......... G60K 2350/00; G60K 2350/106; G60K 2350/1068; G60K 2350/1072; G60K 2350/35; G60K 2350/352; G06F 3/01; G06F 3/1423; G01C 21/36; G02B 27/01
See application file for complete search history.

(56) References Cited

U.S. PATENT DOCUMENTS

| | | | | |
|---|---|---|---|---|
| 2006/0076477 | A1* | 4/2006 | Ishikawa | B60S 1/0822 250/227.25 |
| 2007/0061068 | A1 | 3/2007 | Okamoto et al. | |
| 2007/0182529 | A1* | 8/2007 | Dobler | B60K 28/06 340/438 |
| 2007/0279316 | A1 | 12/2007 | Daude et al. | |
| 2008/0120171 | A1* | 5/2008 | Ikeuchi | G01C 21/32 705/13 |
| 2009/0058684 | A1* | 3/2009 | Yamamoto | B60K 37/02 340/995.1 |
| 2011/0090073 | A1* | 4/2011 | Ozaki | B60R 1/00 340/435 |
| 2013/0190977 | A1* | 7/2013 | Onaka | B60K 37/00 701/36 |

FOREIGN PATENT DOCUMENTS

| | | |
|---|---|---|
| JP | 2002087111 A | 3/2002 |
| JP | 2003322528 A | 11/2003 |
| JP | 2007076382 A | 3/2007 |
| JP | 2007076384 A | 3/2007 |
| JP | 2007512170 A | 5/2007 |
| JP | 2009059229 A | 3/2009 |
| JP | 2011237217 A | 11/2011 |
| JP | 2013032986 A | 2/2013 |

* cited by examiner

VEHICLE DISPLAY PROCESSING APPARATUS

CROSS-REFERENCE TO RELATED APPLICATIONS

This application is a U.S. National Phase Application under 35 U.S.C. 371 of International Application No. PCT/JP2014/004764 filed on Sep. 17, 2014 and published in Japanese as WO 2015/045326 A1 on Apr. 2, 2015. This application is based on and claims the benefit of priority from Japanese Patent Application No. 2013-197105 filed on Sep. 24, 2013. The entire disclosures of all of the above applications are incorporated herein by reference.

TECHNICAL FIELD

The present disclosure relates to a vehicle display processing apparatus.

BACKGROUND ART

For example, in a vehicle equipped with a navigation system, various types of information regarding a navigation function are displayed on a display device (generally, a center display). A user as an occupant of the vehicle uses an intended navigation function while operating and visually confirming information displayed on the display device. However, for a safety reason, it may not be preferable for a driver driving the vehicle to make an operation by visually confirming the display device. Therefore, a function (so-called a drive enforcement) that limits an operation guided by screens displayed on the display device while the vehicle is travelling is used widely (referring to Patent document 1).

The inventor of the present application has found the following regarding a vehicle display processing apparatus.

When an operation is limited while the vehicle is travelling by the drive enforcement, various inconveniences may occur. For example, it is supposed that the driver is operating in order to set a destination using the navigation function while the vehicle is at a stop at a traffic light, and the light turns green before the driver completes the operation. In this case, the driver may have to start the vehicle and may be forced to drive the vehicle with the destination unset. In particular, when the driver gets on an expressway, a chance to stop the vehicle may be rare and an operation incomplete state may continue over a long period. A difficulty as described above may not be unique to an operation that the driver makes when using the navigation function and may also possibly arise from other operations the driver makes in the vehicle by visually confirming the display device.

PRIOR ART DOCUMENT

Patent Document

Patent document 1: JP H09-159468 A

SUMMARY OF INVENTION

It is an object of the present disclosure to provide a technique enabling a driver to perform an operation that should be limited by drive enforcement relatively safely while a vehicle is travelling.

According to a vehicle display processing apparatus of one aspect of the present disclosure, the vehicle display processing apparatus includes: a first determination portion that determines whether a vehicle is at a stop; a first display processing portion that, when the first determination portion determines that the vehicle is at a stop, displays on a first display device, an operation screen image for making an operation, the first display device being provided between a driver seat and a front passenger seat; and a second display processing portion that, when the first determination portion determines that the vehicle is not at a stop, displays a screen image relating to the operation screen image, which is displayed on the first display device, on a second display device provided to a driver seat side.

According to the vehicle display processing apparatus of the present disclosure, a screen relating to the operation screen image being displayed on a first display device while the vehicle is at a stop is displayed on a second display device while the vehicle is travelling. Thus, it may be possible to continue an operation (an operation to be limited by drive enforcement while the vehicle is travelling) that a driver is making by visually confirming the first display device while the vehicle is at a stop, relatively safely while the vehicle is travelling. According to the vehicle display processing apparatus of the present disclosure, it may be possible for the driver to make an operation that should be limited by the drive enforcement relatively safely while the vehicle is travelling.

BRIEF DESCRIPTION OF DRAWINGS

The above and other objects, features and advantages of the present disclosure will become more apparent from the following detailed description made with reference to the accompanying drawings. In the drawings.

PREFERRED EMBODIMENTS FOR CARRYING OUT INVENTION

An embodiment to which the present disclosure is applied will be explained with referring the drawings.

1. Configuration

Figure 1:
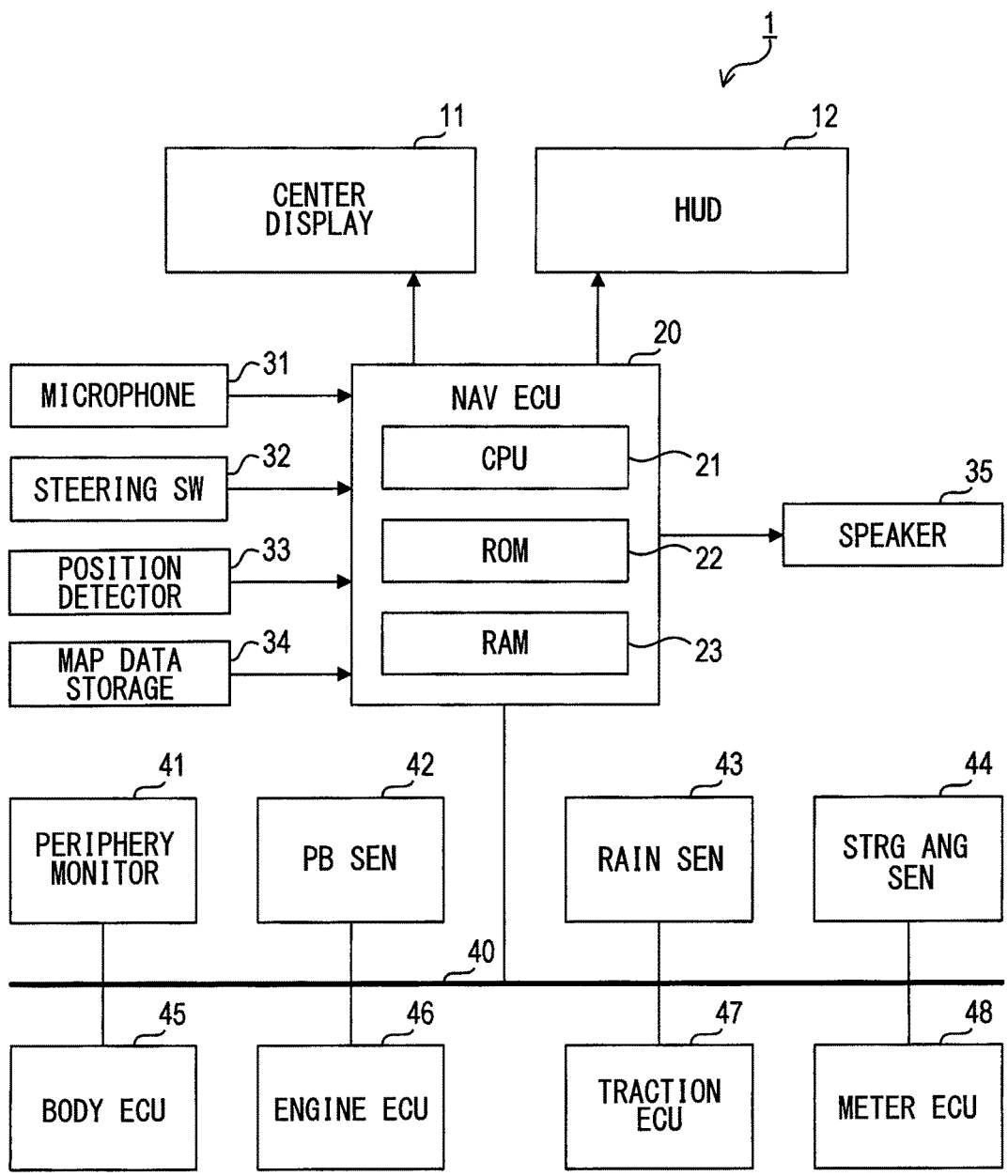
FIG. 1 is a block diagram illustrating a configuration of a vehicle display system.

A vehicle display system 1 described in FIG. 1 is mounted to a vehicle. The vehicle display system 1 includes a center display 11, a head-up display 12, and a navigation ECU 20. The vehicle display system 1 also includes a microphone 31, a steering switch 32, a position detector 33, a map data storage portion 34, and a speaker 35. The vehicle display system 1 further includes a periphery monitor device 41, a parking brake sensor 42, a rain sensor 43, a steering angle sensor 44, a body ECU 45, an engine ECU 46, a traction ECU 47, and a meter ECU 48.

The center display 11 is a display device visually confirmed by multiple occupants (for example, an occupant sitting in a front passenger seat) including a driver of a subject vehicle (a vehicle mounted with the vehicle display system 1). The center display 11 is disposed at a center part of an instrument panel (a dashboard). The instrument panel generally represents an equipment portion in a front part of a vehicle interior, in which meters, a glove box, or the like are stored. The center part of the instrument panel represents a portion between a portion in front of the driver seat and a portion in front of the front passenger seat. The center display 11 is provided between the driver seat and the front passenger seat. The center display 11 of the present embodiment is a touch-panel liquid crystal display.

The head-up display (HUD) 12 corresponds to a display device (a display device exclusive for the driver) visually confirmed by the driver while driving. The head-up display 12 displays an image superimposed to scenery outside of the vehicle (a field of view in front of the driver) visually confirmed through a position in front of the driver within a windshield (a front glass). An image displayed by the head-up display 12 is visually confirmed on a virtual image screen further ahead of the windshield. The head-up display 12 is provided to a side of the driver seat. Incidentally, a transparent screen (so-called a combiner) may be disposed in front of the windshield so as to display an image superimposed to the scenery outside of the vehicle visually confirmed through the combiner and the windshield.

The center display 11 of the present embodiment has a larger display screen and higher resolution as compared with the head-up display 12. The center display 11 excels the head-up display 12 at visibility of an image (easiness of view of display contents). Moreover, since the center display 11 is operable by touching on a touch panel, the center display 11 excels the head-up display 12 at operability of operation that is made while visually confirming a display screen.

The head-up display 12 requires a smaller amount of sightline shift for visual confirmation while driving in comparison with the center display 11. The head-up display 12 excels the center display 11 at easiness of visual confirmation while driving.

The navigation ECU 20 is an electronic control unit including a CPU 21, a ROM 22, and a RAM 23. The navigation ECU 20 integrally controls the vehicle display system 1 by causing the CPU 21 to perform processing according to a program stored in a storage medium such as the ROM 22. The navigation ECU 20 also performs processing to realize a navigation function such as, for example, processing to identify a position of the subject vehicle on the map, processing to search for a route to a set destination, and processing to give guidance along the searched route. Furthermore, the navigation ECU 20 includes a voice recognition function.

The microphone 31 corresponds to an input device for inputting voice uttered from an occupant (at least the driver) of the subject vehicle, and is provided inside the vehicle interior. In the vehicle display system 1, the microphone 31 is used to input voice as a command in a voice operation (an operation using voice recognition).

The steering switch 32 corresponds to a switch that is used by the driver in order to operate the navigation function, an audio function, or the like while driving. The steering switch 32 is provided on a surface of a steering wheel (for example, at a position at which the driver can make an operation with a fingertip while holding the steering wheel).

The position detector 33 includes a GPS receiver (not shown), a gyroscope, and a distance sensor. The GPS receiver receives a transmission signal from a GPS (Global Positioning System) satellite and detects a position coordinate and an altitude of the subject vehicle. The gyroscope outputs a detection signal corresponding to an angular velocity of rotational motion applied to the subject vehicle.

The distance sensor outputs a distance that the subject vehicle has traveled. The position detector 33 calculates a current position of the subject vehicle based on the output signals from the respective sensors.

The map data storage portion 34 corresponds to a storage device storing map data representing a map. The map data includes information on roads on which a vehicle enables to travel such as information on types of road (an expressway including a toll road and a vehicle-only road, a national road, and other general roads), and information on a curved road.

The speaker 35 corresponds to an output device that outputs sounds to an occupant (at least the driver) of the subject vehicle, and provided inside the vehicle interior. For example, a music played by the audio function and audio guidance on a route by the navigation function are outputted from the speaker 35.

The periphery monitor device 41 monitors the presence or absence of an obstacle around (on the periphery of) the subject vehicle. The term "around the subject vehicle" means a range within a predetermined distance in all directions about the subject vehicle. The obstacle includes a general object such as another vehicle, a pedestrian, and an immovable object. In order to monitor an obstacle, multiple obstacle sensors are used. Each obstacle sensor detects the presence of an obstacle by transmitting ultrasonic waves as a detection wave and receiving a reflected wave. Incidentally, instead of or in addition, the ultrasonic waves, infrared rays or a camera or both may be used.

The parking brake sensor 42 corresponds to a sensor to detect an operation state (ON or OFF state) of a parking brake.

The rain sensor 43 corresponds to a sensor to detect a raindrop adhering onto the windshield (that is, rainfall).

The steering angle sensor 44 corresponds to a sensor to detect a steering angle of the steering wheel.

The body ECU 45 corresponds to an electronic control unit that detects an operation state of a wiper.

The engine ECU 46 corresponds to an electronic control unit furnished with a function of detecting a running speed and acceleration of the subject vehicle.

The traction ECU 47 corresponds to an electronic control unit furnished with a function of detecting a shifting state of a gear.

The meter ECU 48 corresponds to an electronic control unit furnished with a function of detecting an operation state of a turn signal (an indicator).

The navigation ECU 20 is connected to the periphery monitor device 41, the parking brake sensor 42, the rain sensor 43, the steering angle sensor 44, the body ECU 45, the engine ECU 46, the traction ECU 47, and the meter ECU 48 through a vehicle LAN 40. The vehicle LAN 40 corresponds to a network constituted to enable communication among multiple devices equipped to the subject vehicle. Sensors, such as the parking brake sensor 42, the rain sensor 43, and the steering angle sensor 44, may be connected to the vehicle LAN 40 through an ECU.

2. Processing

Figure 2:
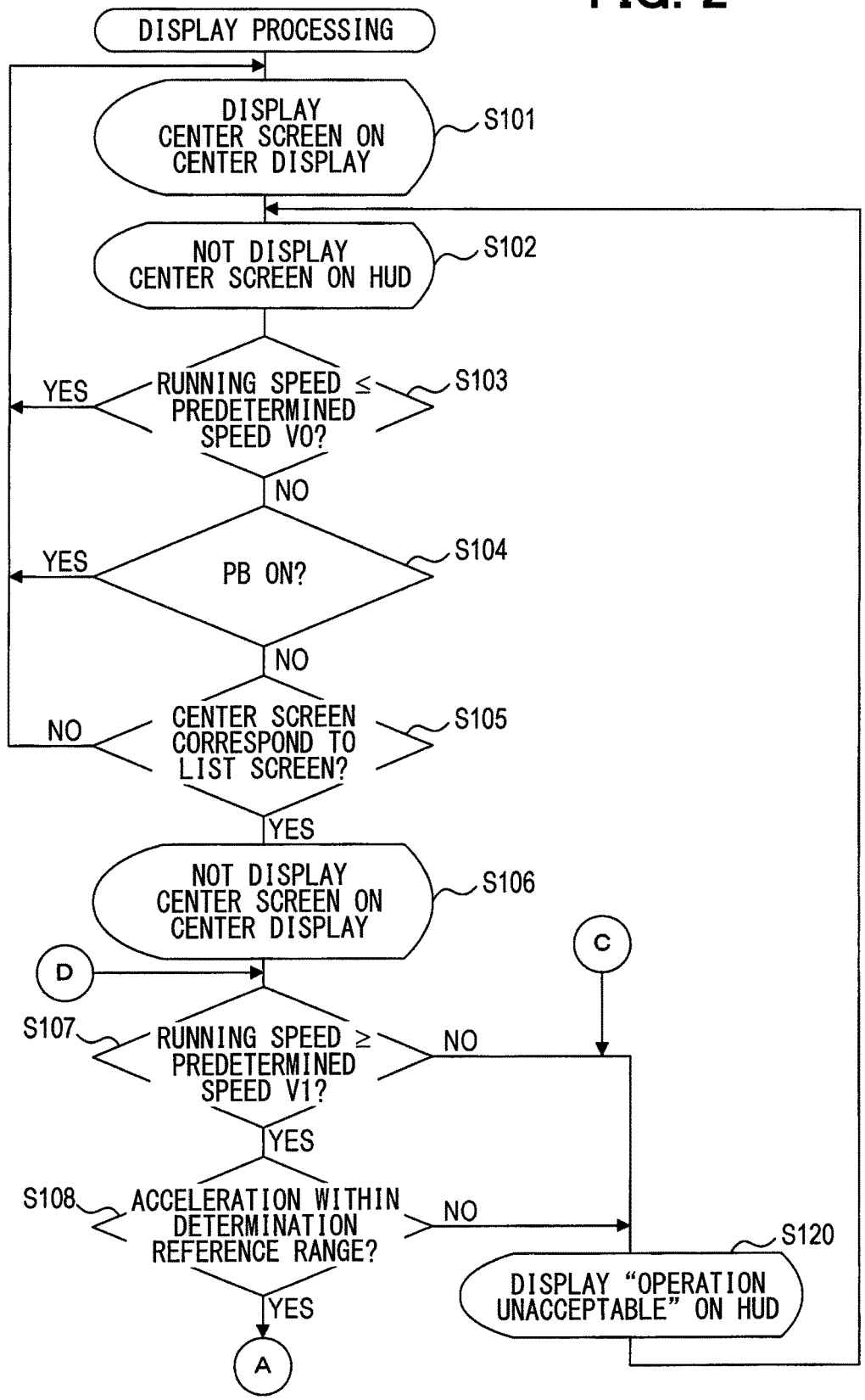
FIG. 2 is a flowchart illustrating a first display processing.
Figure 3:
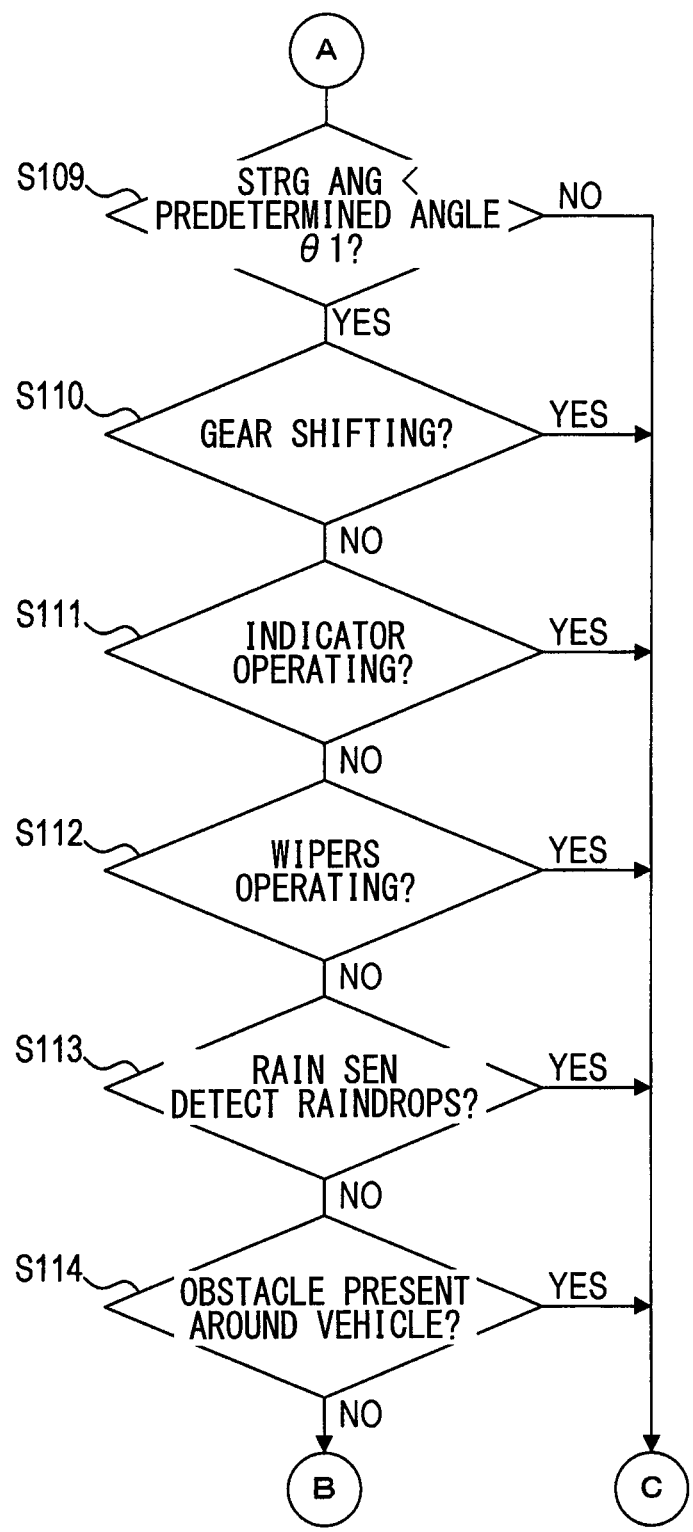
FIG. 3 is a flowchart illustrating a second display processing.
Figure 4:
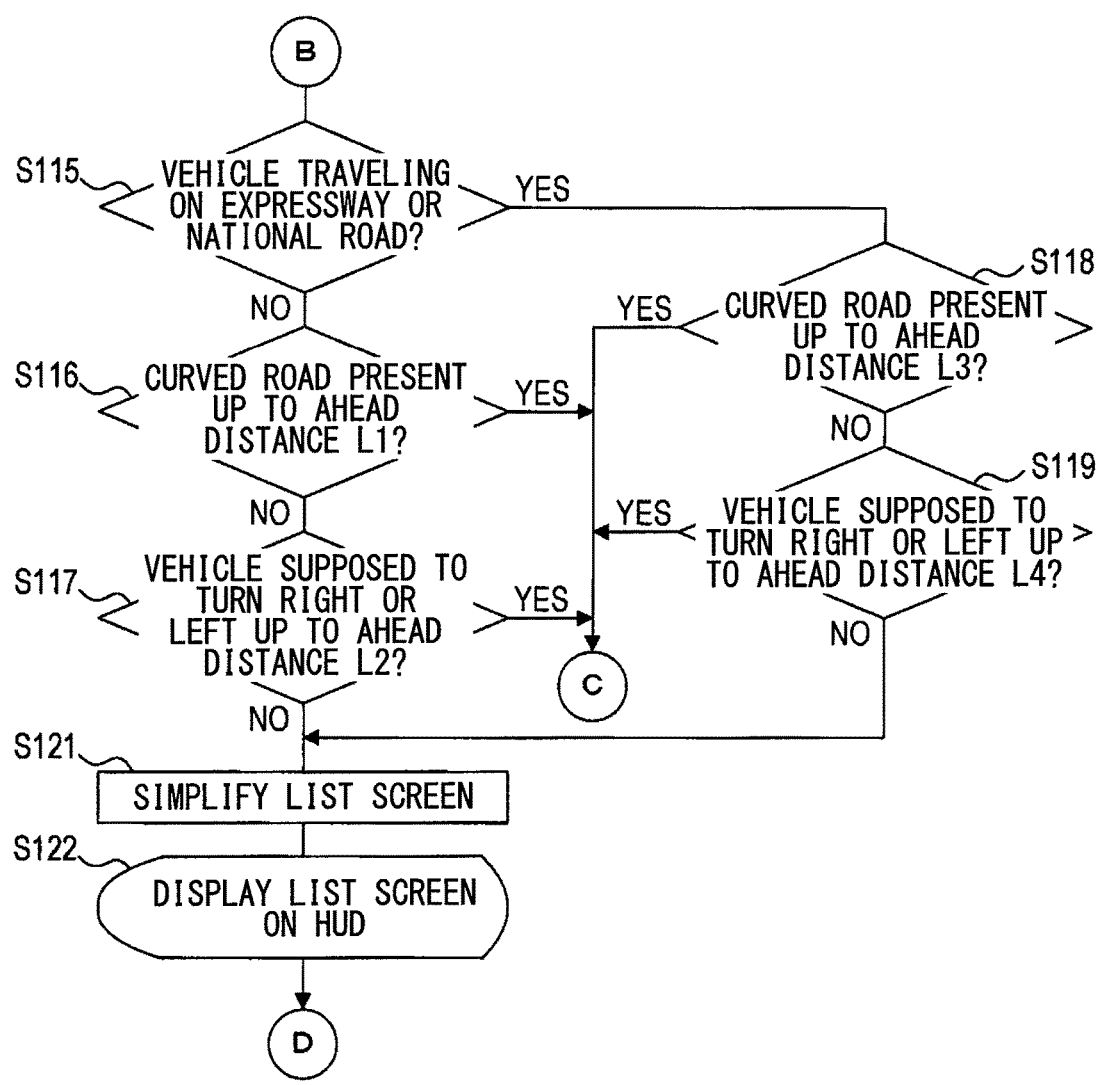
FIG. 4 is a flowchart illustrating a third display processing.

Display processing executed by the navigation ECU 20 (more specifically, the CPU 21) according to a program will be described using the flowcharts of FIG. 2, FIG. 3, and FIG. 4. The display processing starts when an accessory switch of the subject vehicle is turned ON.

The navigation ECU 20 first causes the center display 11 to display a screen image (hereinafter, referred to as a center screen image) to be displayed on the center display 11

(S101). More specifically, when the display processing starts, a menu screen (an initial screen) listing multiple items for functions, such as the navigation function and the audio function, made available by an operation of the occupant (a user) is displayed as the center screen image. Thereafter, a screen corresponding to an operation of the occupant is displayed as the center screen image. For example, when an item to make the navigation function available is selected by an operation of the occupant, a screen image relating to the navigation function (a map screen, a destination setting screen, or the like) is displayed. An operation using the center display 11 is made by at least one of a touch panel operation, a voice operation, an operation on the steering switch 32.

Subsequently, the navigation ECU 20 performs processing not to display the center screen image on the head-up display 12 (S102). At the beginning of the display processing, the center screen image is not displayed on the head-up display 12, so that this non-display state is maintained. When the center screen image is displayed on the head-up display 12 in a processing (S112) described below, the navigation ECU 20 switches the vehicle display system 1 to a state in which the center screen image is not displayed on the head-up display 12. While the center screen image is not displayed on the head-up display 12, a screen to be displayed on the head-up display 12 (hereinafter, referred to as a HUD screen image) is displayed on the head-up display 12. The HUD screen image referred to herein means mere information to be visually confirmed, for example, a running speed of the subject vehicle, a radio frequency, a title of a song being played, and information on route guidance.

The navigation ECU 20 determines whether a running speed of the subject vehicle is equal to or lower than a predetermined speed V0 (in this embodiment, 0 km/h) (S103). When it is determined in S103 that the running speed is equal to or lower than the predetermined speed V0 (S103: YES), the navigation ECU 20 returns to the processing in S101. When it is determined in S103 that the running speed is not equal to or lower than the predetermined speed V0 (above the predetermined speed V0) (S103: NO), the navigation ECU 20 determines whether the parking brake is ON (S104). When it is determined in S104 that the parking brake is ON (S104: YES), the navigation ECU 20 returns to the processing in S101. When it is determined in S104 that the parking brake is not ON (S104: NO), the navigation ECU 20 shifts to processing in S105.

The navigation ECU 20 determines whether the subject vehicle is at a stop (is in a stopped state) based on a running speed of the subject vehicle and an operation state of the parking brake (S103 and S104). While the subject vehicle is at a stop (S103: YES or S104: YES), the navigation ECU 20 continues to display the center screen image on the center display 11 (S101) and continues to allow an operation using the center display 11. When the subject vehicle is not at a stop (moving) (S103: NO and S104: NO), the navigation ECU 20 shifts to processing in S105.

Figure 5:
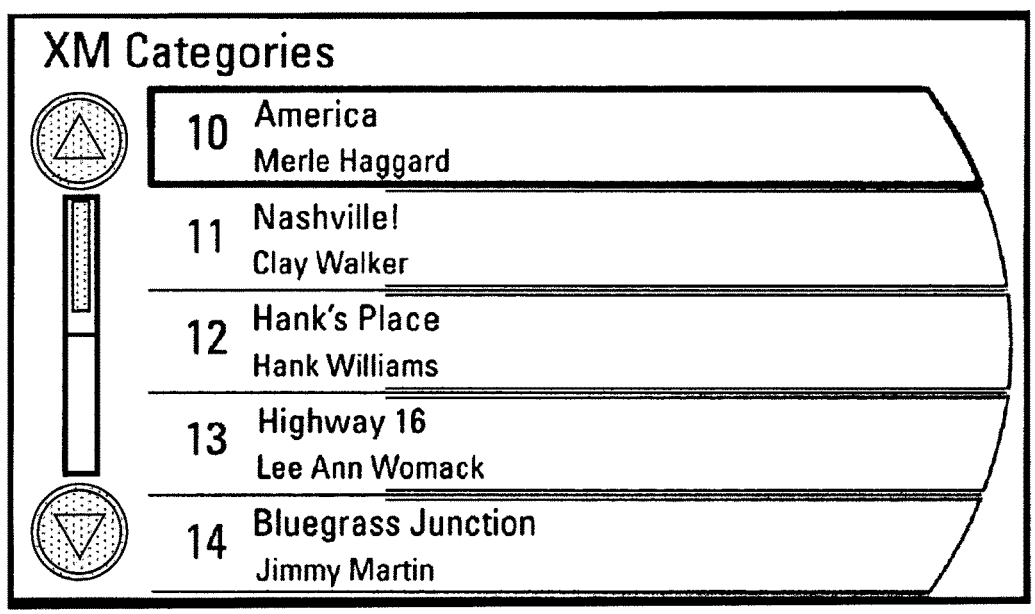
FIG. 5 is a diagram showing an item selection screen image displayed on a center display.

In S105, the navigation ECU 20 determines whether the currently displayed center screen image is an item selection screen image (a list screen image). The item selection screen image is an operation screen image with which the driver makes an operation by visually confirming a displayed screen. The item selection screen image means, for example, a screen as shown in FIG. 5 on which multiple items to be selected by the driver are arranged. The item selection screen image shown in FIG. 5 shows a list of multiple song titles. It should be noted that the items listed on the item selection screen image are not limited to song titles. For example, the items listed on the item selection screen image may be items used to set a destination (categories, alphabet, Japanese syllabary, or the like).

When it is determined in S105 that the center screen image is not the item selection screen image (S105: NO), the navigation ECU 20 returns to the processing in S101. When it is determined in S105 that the center screen image is the item selection screen image (S105: YES), the navigation ECU 20 performs processing not to display the center screen image on the center display 11 (S106). More specifically, when the center screen image is being displayed on the center display 11 by the processing (S101), the navigation ECU 20 switches the center display to a state in which the center screen image is not displayed on the center display 11. When the center screen image is not displayed on the center display 11, the non-display state is maintained.

Even when the subject vehicle shifts to a travelling state (S103: NO and S104: NO), the navigation ECU 20 continues to display the center screen image on the center display 11 (S101) unless the center screen image is the item selection screen image (S105: NO). In this case, an operation using the center display 11 is permitted. When the center screen image is the item selection screen image (S105: YES), the navigation ECU 20 does not display the center screen image on the center display 11 (S106), and limits (inhibits) the operation using the center display 11.

Incidentally, instead of the processing not to display the center screen image on the center display 11, a display mode of the center screen image may be changed to a display mode that indicates an operation is unacceptable (for example, a gray-out display), so that an operation using the center display 11 may be limited. Incidentally, the operation using the center display 11 means an operation performed by an occupant while visually confirming a screen displayed on the center display 11 (in this embodiment, a touch operation).

The navigation ECU 20 determines whether the running speed of the subject vehicle is equal to or greater than a predetermined speed V1 (V1 is at a value greater than V0, and 20 km/h in the present embodiment) (S107). When it is determined in S107 that the running speed is not equal to or greater the predetermined speed V1 (below the predetermined speed V1) (S107: NO), the navigation ECU 20 shifts to processing in S120. In S120, the navigation ECU 20 displays information (caution information, such as a message and a mark) indicating that an operation is unacceptable on the head-up display 12 and returns to the processing in S102.

When it is determined in S107 that the running speed is equal to or greater than the predetermined speed V1 (S107: YES), the navigation ECU 20 determines whether acceleration of the subject vehicle is within a predetermined determination reference range (including negative acceleration, namely, deceleration) (S108). The determination reference range referred to herein means a range (a range including 0) from a lower-limit value A1 of negative acceleration to an upper-limit value A2 of positive acceleration. When it is determined in S108 that the acceleration is not within the determination reference range (out of the determination reference range) (S108: NO), the navigation ECU 20 displays the information informing that an operation is unacceptable on the head-up display 12 (S120) and returns to the processing in S102.

When it is determined in S108 that the acceleration is within the determination reference range (S108: YES), the navigation ECU 20 determines whether a steering angle (an absolute value of an angle in reference to straight-ahead state) of the steering wheel is less than a predetermined angle θ1 (S109). When it is determined in S109 that the steering angle is not less than the predetermined angle θ1 (equal to or greater than the predetermined angle θ1) (S109: NO), the navigation ECU 20 displays the information informing that an operation is unacceptable on the head-up display 12 (S120) and returns to the processing in S102.

When it is determined in S109 that the steering angle is less than the predetermined angle θ1 (S109: YES), the navigation ECU 20 determines whether the gear of the subject vehicle is shifting (gear change state) (S110). When it is determined in S110 that the gear is shifting (S110: YES), the navigation ECU 20 displays the information informing that an operation is unacceptable on the head-up display 12 (S120) and returns to the processing in S102.

When it is determined in S110 that the gear is not shifting (S110: NO), the navigation ECU 20 determines whether the turn signal of the subject vehicle is operating (S111). When it is determined in S111 that the turn signal is operating (S111: YES), the navigation ECU 20 displays the information informing that an operation is unacceptable on the head-up display 12 (S120) and returns to the processing in S102.

When it is determined in S111 that the turn signal is not operating (S111: NO), the navigation ECU 20 determines whether the wiper of the subject vehicle is operating (S112). When it is determined in S112 that the wiper of the subject vehicle is operating (S112: YES), the navigation ECU 20 displays the information informing that an operation is unacceptable on the head-up display 12 (S120) and returns to the processing in S102.

When it is determined in S112 that the wiper of the subject vehicle is not operating (S112: NO), the navigation ECU 20 determines whether a raindrop is detected by the rain sensor 43 (S113). When it is determined in S113 that a raindrop is detected by the rain sensor 43 (S113: YES), the navigation ECU 20 displays the information informing that an operation is unacceptable on the head-up display 12 (S120) and returns to the processing in S102.

When it is determined in S113 that a raindrop is not detected by the rain sensor 43 (S113: NO), the navigation ECU 20 determines whether an obstacle is detected around (within a predetermined range of) the subject vehicle by the periphery monitor device 41 (S114). When it is determined in S114 that an obstacle is detected (S114: YES), the navigation ECU 20 displays the information informing that an operation is unacceptable on the head-up display 12 (S120) and returns to the processing in S102.

When it is determined in S114 that an obstacle is not detected (S114: NO), the navigation ECU 20 shifts to processing in S115. In S115, the navigation ECU 20 determines whether the subject vehicle is traveling on either an expressway or a national road based on the position of the subject vehicle on the map of the map data. When it is determined in S115 that the subject vehicle is traveling on neither an expressway nor a national road (the subject vehicle is traveling on a general road other than national roads) (S115: NO), the navigation ECU 20 shifts to processing in S116.

In S116, the navigation ECU 20 determines whether a curved road is present on the route (route the subject vehicle is supposed to take) up to a distance L1 ahead of the subject vehicle (S116) based on the position of the subject vehicle on the map of the map data. When the route is guided, whether a curved road is present on the guided route is determined. When the route is not guided, whether a curved road is present on the route along a pathway is determined.

When it is determined in S116 that a curved road is present up to the distance L1 ahead (S116: YES), the navigation ECU 20 displays the information indicating that an operation is unacceptable on the head-up display 12 (S120) and returns to the processing in S102. When it is determined in S116 that a curved road is not present up to the distance L1 ahead (S116: NO), the navigation ECU 20 shifts to processing in S117.

In S117, the navigation ECU 20 determines whether a road onto which the subject vehicle is supposed to turn right or left is present on the route up to a distance L2 ahead of the subject vehicle based on the position of the subject vehicle on the map of the map data (S117). When the route is guided, it is determined whether a road onto which the subject vehicle is supposed to turn right or left is present on the guided route. When the route is not guided, whether a road that requires a right or left turn (for example, T-junction or L-junction) is present on the route along a road is determined.

When it is determined in S117 that a road onto which the subject vehicle is supposed to turn right or left is present up to the distance L2 ahead (S117: YES), the navigation ECU 20 displays the information informing that an operation is unacceptable on the head-up display 12 (S120) and returns to the processing in S102. When it is determined in S117 that a road onto which the subject vehicle is supposed to turn right or left is not present up to the distance L2 ahead (S117: NO), the navigation ECU 20 shifts to processing in S121.

When it is determined in S115 that the subject vehicle is traveling on either an expressway or a national road (S115: YES), the navigation ECU 20 determines whether a curved road is present on the route up to a distance L3 ahead of the subject vehicle (S118). Incidentally, the distance L3 is set to a long distance as compared with the distance L1 of S116.

When it is determined in S118 that a curved road is present up to the distance L3 ahead (S118: YES), the navigation ECU 20 displays the information informing that an operation is unacceptable on the head-up display 12 (S120) and returns to the processing in S102. When it is determined in S118 that a curved road is not present up to the distance L3 ahead (S118: NO), the navigation ECU 20 determines whether a road onto which the subject vehicle is supposed to turn right or left is present on the route up to a distance L4 ahead of the subject vehicle (S119). The distance L4 is set to a long distance in comparison with the distance L2 used in S117.

When it is determined in S119 that a road onto which the subject vehicle is supposed to turn right or left is present up to the distance L4 ahead (S119: YES), the navigation ECU 20 displays the information informing that an operation is unacceptable on the head-up display 12 (S120) and returns to the processing in S102. When it is determined in S119 that a road onto which the subject vehicle is supposed to turn right or left is not present up to the distance L4 ahead (S119: NO), the navigation ECU 20 shifts to processing in S121.

In S121, the navigation ECU 20 simplifies the item selection screen image. The navigation ECU 20 displays a simplified item selection screen image on the head-up display 12 (S122) and returns to the processing in S107.

Figure 6:
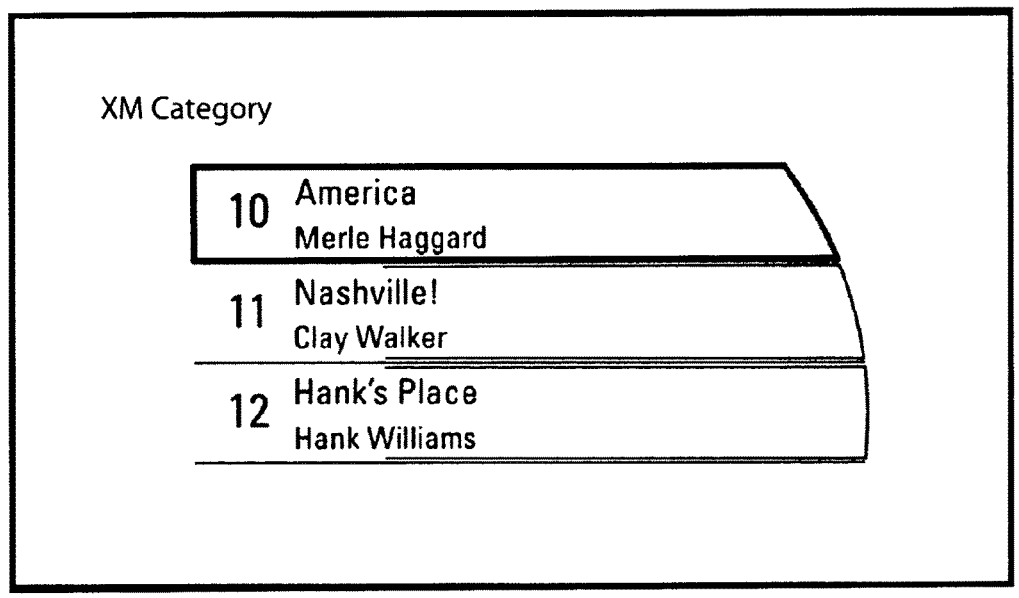
FIG. 6 is a diagram showing an item selection screen image displayed on a head-up display.

More specifically, as shown in FIG. 5, five items are listed in the item selection screen image displayed on the center display 11. In contrast, as is shown in FIG. 6, three items are listed in the item selection screen image displayed on the head-up display 12. The navigation ECU 20 displays a part of the items of the item selection screen image that is displayed on the center display 11, on the head-up display 12 (reduces the amount of information displayed within the display screen at a time). Therefore, the item selection screen image is displayed on the head-up display 12 in a display mode different from the display mode of the center display 11. In other words, the navigation ECU 20 displays a screen associated with the operation screen image (herein, the item selection screen image) being displayed on the center display 11 on the head-up display 12.

The center screen image to be displayed on the center display 11 is displayed on the head-up display 12 (a screen on the head-up display 12 is switched). In this case, it may be possible for the driver to make an operation by visually confirming the screen displayed on the head-up display 12 using a voice operation or an operation on the steering switch 32.

After the navigation ECU 20 limits (inhibits) the operation by the center display 11, the navigation ECU 20 determines whether the subject vehicle is in a HUD operation enable state (S107 through S119). The HUD operation enable state requires the subject vehicle is moving as a necessary condition. In the present embodiment, a state in which the subject vehicle is traveling steadily and hence a driving load is expected to be low is set as the HUD operation enable state. When the navigation ECU 20 determines that the subject vehicle is in the HUD operation enable state, the navigation ECU 20 displays the center screen image (the item selection screen image) on the head-up display 12 (S121 and S122).

3. Effect

Effect as follows can be obtained by the present embodiment.

(3A) The navigation ECU 20 determines whether the subject vehicle is at a stop (S103 and S104). The navigation ECU 20 causes the center display 11 to display the center screen image on the center display 11 while the vehicle is at a stop (S101). The navigation ECU 20 determines whether the subject vehicle is in the HUD operation enable state. In the HUD operation enable state, the subject vehicle requires not to be at a stop (be travelling) as a necessary condition (S107 through S119). In the HUD operation enable state (a travelling state), the navigation ECU 20 displays the center screen image (the item selection screen image) on the head-up display 12 (S121 and S122). Thus, in the present embodiment, the center screen image (the item selection screen image) being displayed on the center display 11 while the subject vehicle is at a stop is displayed on the head-up display 12 while the subject vehicle is travelling. Hence, according to the present embodiment, it may be possible that the driver continues an operation (an operation to be limited by enforced traveling while the subject vehicle is travelling) that the driver is making by visually confirming the center display 11 while the subject vehicle is at a stop, relatively safely while the subject vehicle is travelling. For example, it is supposed that the driver is making an operation to set a destination using the navigation function while the vehicle is at a stop at a traffic light. When the light turns green before the driver completes the operation, the driver has to start the vehicle and may be forced to drive the vehicle with the destination unset. In particular, once the driver gets on an expressway, a chance to stop the vehicle may be rare and an operation incomplete state may continue over a long period. According to the present embodiment, it may be possible that the driver completes the operation to set the destination after the subject vehicle shifts to a travelling state (while the subject vehicle is travelling) by making an operation using the head-up display 12.

(3B) The navigation ECU 20 limits the operation using the center display 11 while the subject vehicle is travelling (S106). Thus, according to the present embodiment, it may be possible to prevent the driver from making the operation using the center display 11 even when the subject vehicle is travelling.

(3C) The navigation ECU 20 requires that, as a necessary condition, a running speed of the subject vehicle is equal to or greater than the predetermined speed V1, which is greater than 0, to determine that the subject vehicle is in the HUD operation enable state (S107). When the running speed of the subject vehicle is lower than the predetermined speed V1 (S107: NO), the navigation ECU 20 does not display the center screen image on the head-up display 12 (S102). According to the present embodiment, from the viewpoint of a running speed, it may be possible to set a state in which the subject vehicle is travelling steadily (the subject vehicle is traveling at a reasonable speed) as a necessary condition of the HUD operation enable state. In other words, it may be possible to prevent the driver from making the operation using the head-up display 12 when the subject vehicle is not travelling steadily (for example, immediately after the subject vehicle starts moving).

(3D) The navigation ECU 20 requires acceleration of the subject vehicle be within the predetermined determination reference range including 0 as a necessary condition to determine that the subject vehicle is in the HUD operation enable state (S108). When acceleration of the subject vehicle is out of the determination reference range (S108: NO), the navigation ECU 20 does not display the center screen image on the head-up display 12 (S102). Thus, according to the present embodiment, from the viewpoint of acceleration, it may be possible to set a state in which the subject vehicle is traveling steadily (the running speed is steady) as a necessary condition of the HUD operation enable state. In other words, it may be possible to prevent a driver from making operation using the head-up display 12 while a running speed of the subject vehicle is not steady (for example, at abrupt acceleration or abrupt deceleration).

(3E) The navigation ECU 20 requires a steering angle of the steering wheel of the subject vehicle be less than the predetermined angle as a necessary condition to determine that the subject vehicle is in the HUD operation enable state (S109). When the steering angle of the subject vehicle is equal to or greater than the predetermined angle (S109: NO), the navigation ECU 20 does not display the center screen image on the head-up display 12 (S102). Thus, according to the present embodiment, from the viewpoint of an operation state of the steering wheel, it may be possible to set a state in which the subject vehicle is traveling steadily (a traveling direction is certain) as a necessary condition of the HUD operation enable state. In other words, it may be possible to prevent a driver from making an operation using the head-up display 12 while a traveling direction of the subject vehicle is uncertain (for example, when traveling along a curved road or turning right or left).

(3F) The navigation ECU 20 requires the gear of the subject vehicle not be shifting as a necessary condition to determine that the subject vehicle is in the HUD operation enable state (S110). When the gear of the subject vehicle is shifting (S110: YES), the navigation ECU 20 does not display the center screen image on the head-up display 12 (S102). Thus, according to the present embodiment, from the viewpoint of a gear transmission state, it may be possible to set a state in which the subject vehicle is traveling steadily as a necessary condition of the HUD operation enable state.

In other words, it may be possible to prevent a driver from making an operation using the head-up display 12 while the gear is shifting.

(3G) The navigation ECU 20 requires the turn signal of the subject vehicle not be operating as a necessary condition to determine that the subject vehicle is in the HUD operation enable state (S111). When the turn signal of the subject vehicle is operating (S111: YES), the navigation ECU 20 does not display the center screen image on the head-up display 12 (S102). Thus, according to the present embodiment, from the viewpoint of an operation state of the turn signal, it may be possible to set a state in which the subject vehicle is traveling steadily as a necessary condition of the HUD operation enable state. In other words, it may be possible to prevent a driver from making an operation using the head-up display 12 while a traveling direction of the vehicle is uncertain (for example, when switching lanes or turning right or left).

(3H) The navigation ECU 20 requires the wiper of the subject vehicle not be operating as a necessary condition to determine that the subject vehicle is in the HUD operation enable state (S112). When the wiper of the subject vehicle is operating (S112: YES), the navigation ECU 20 does not display the center screen image on the head-up display 12 (S102). Thus, according to the present embodiment, from the viewpoint of an operation state of the wiper, it may be possible to set a state in which weather in the surrounding area of the subject vehicle is fair as a necessary condition of the HUD operation enable state. In other words, it may be possible to prevent a driver from making an operation using the head-up display 12 when a driving load is expected to increase due to poor weather (for example, rainy weather).

(3I) The navigation ECU 20 requires no raindrops be detected by the rain sensor 43 that detects a raindrop adhering onto the subject vehicle as a necessary condition to determine that the subject vehicle is in the HUD operation enable state (S113). When a raindrop is detected (S113: YES), the navigation ECU 20 does not display the center screen image on the head-up display 12 (S102). Thus, according to the present embodiment, from the viewpoint of detection information of the rain sensor 43, it may be possible to set a state in which weather in the surrounding area of the subject vehicle is fair as a necessary condition of the HUD operation enable state. In other words, it may be possible to prevent a driver from making an operation using the head-up display 12 when a driving load is expected to increase due to poor weather (for example, rainy weather).

(3J) The navigation ECU 20 requires no obstacle be detected by the periphery monitor device 41 that detects an obstacle within a predetermined range around the subject vehicle as a necessary condition to determine that the subject vehicle is in the HUD operation enable state (S114). That is to say, when an obstacle is detected (S114: YES), the navigation ECU 20 does not display the center screen image on the head-up display 12 (S102). Thus, according to the present embodiment, from the viewpoint of detection information of the periphery monitor device 41, it may be possible to set a state in which no obstacle is present within the predetermined range around the subject vehicle as a necessary condition of the HUD operation enable state. In other words, it may be possible to prevent a driver from making an operation using the head-up display 12 when a driving load is expected to increase due to the presence of an obstacle (for example, another vehicle, a pedestrian, an immovable object) within a predetermined range around the subject vehicle.

(3K) The navigation ECU 20 requires no curved road be detected on the route up to a predetermined distance (either distance L1 or distance L3) ahead of the subject vehicle as a necessary condition to determine that the subject vehicle is in the HUD operation enable state (S116 or S118). When a curved road is detected (S116: YES or S118: YES), the navigation ECU 20 does not display the center screen image on the head-up display 12 (S102). Thus, according to the present embodiment, from the viewpoint of road information on the route the subject vehicle, it may be possible to set a state in which a driving load is expected to increase as a necessary condition of the HUD operation enable state. In other words, it may be possible to prevent a driver from making an operation using the head-up display 12 when a driving load has been increased due to the travelling along a curved road.

(3L) The navigation ECU 20 determines whether the subject vehicle is traveling on either an expressway or a national road (S115). The navigation ECU 20 sets the distance L3 at the time when it is determined that the subject vehicle is traveling on either an expressway or a national road to a long distance in comparison with the distance L1 at the time when it is determined that the subject vehicle is traveling on a general road other than national roads. Thus, according to the present embodiment, it may be possible to switch a determination as to whether the subject vehicle is in the HUD operation enable state at an appropriate timing for a curved road present on the route ahead even when the subject vehicle is traveling on an expressway or a national road where a running speed is high in comparison with a general road other than national roads.

(3M) The navigation ECU 20 requires no road onto which the subject vehicle is supposed to turn right or left be detected on the route up to a predetermined distance (either distance L2 or distance L4) ahead of the subject vehicle as a necessary condition to determine that the subject vehicle is in the HUD operation enable state (S117 or S119). When a road onto which the subject vehicle is supposed turn right or left is detected (S117: YES or S119: YES), the navigation ECU 20 does not display the center screen image on the head-up display 12 (S102). Thus, according to the present embodiment, from the viewpoint of road information on the route the subject vehicle is supposed to take, it may be possible to set a state in which a driving load is expected to increase as a necessary condition of the HUD operation enable condition. In other words, it may be possible to prevent a driver from making an operation using the head-up display 12 when a driving load has been increased due to a right or left turn.

(3N) The navigation ECU 20 determines whether the subject vehicle is traveling on either an expressway or a national road (S115). The navigation ECU 20 sets the distance L4 at the time when it is determined that the subject vehicle is traveling on either an expressway or a national road to a long distance in comparison with the distance L2 at the time when it is determined that the subject vehicle is traveling on a general road other than national roads. Thus, according to the present embodiment, it may be possible to switch a determination as to whether the subject vehicle is in the HUD operation enable state at an appropriate timing for a road onto which the subject vehicle is supposed to turn right or left on the route ahead even when the subject vehicle is traveling on a national road where the running speed is higher than a general road other than national roads.

(3O) The navigation ECU 20 does not display the center screen image on the head-up display 12 even when the subject vehicle is travelling (S103: NO and S104: NO)

unless the center screen image is the item selection screen image (S105: NO). Thus, according to the present embodiment, it may be possible not to prevent a HUD screen to be displayed on the head-up display 12 from being displayed more than necessary.

(3P) The navigation ECU 20 displays a part of items in the item selection screen image being displayed on the center display 11 on the head-up display 12. Thus, according to the present embodiment, it may be possible that items are displayed on the head-up display 12 in a manner easy to visually confirm for the driver.

(3Q) The navigation ECU 20 displays the center screen image on the head-up display 12 in a display mode different from the display mode of the center display 11. Thus, even when, as in the present embodiment, a size and resolution of the display screen are different between the head-up display 12 and the center display 11, it may be possible that the center screen image is displayed on the head-up display 12 in a display mode easy to visually confirm for the driver.

(3R) The navigation ECU 20 reduces the amount of information displayed on the head-up display 12 at a time in comparison with the amount of information displayed on the center display 11 at a time. Thus, even in a case as in the present embodiment where the screen on the center display 11 cannot be displayed intact on the head-up display 12 due to a smaller size and low resolution of the display screen, it may be possible that the screen is displayed in a display mode suitable to the head-up display 12.

Incidentally, in the present embodiment, the center display 11 corresponds to an example of a first display device, and the head-up display 12 corresponds to an example of a second display device. The navigation ECU 20 corresponds to an example of a vehicle display processing apparatus, and the periphery monitor device 41 corresponds to an example of an obstacle detector.

S101 corresponds to an example of processing as a first display processing portion. S103 and S104 correspond to an example of processing as a first determination portion. S106 corresponds to an example of processing as a limiting portion. S107 corresponds to an example of processing as a second determination portion. S108 corresponds to an example of processing as a third determination portion. S109 corresponds to an example of processing as a fourth determination portion. S110 corresponds to an example of processing as a fifth determination portion. S111 corresponds to an example of processing as a sixth determination portion. S112 corresponds to an example of processing as a seventh determination portion. S113 corresponds to an example of processing as an eighth determination portion. S114 corresponds to an example of processing as a ninth determination portion. S115, S116, and S118 correspond to an example of processing as a tenth determination portion. S115, S117, and S119 correspond to an example of processing as an eleventh determination portion. S102, S121, and S122 correspond to an example of processing as a second display processing portion.

The predetermined speed V1 corresponds to an example of a determination reference speed. The distance L1 and the distance L3 correspond to an example of a first distance. The distance L2 and the distance L4 correspond to an example of a second distance. An expressway and a national road correspond to an example of a road of a first type and a road of a third type. A general road other than the national road corresponds to an example of a road of a second type and a road of a fourth type.

4. Other Embodiments

While the embodiment of the present disclosure has been described, the present disclosure is not limited to the above embodiment and may be modified in various modes.

(4A) In the display processing (FIG. 2 through FIG. 4), whether the subject vehicle is at a stop or travelling is determined based on the determination processing in S103 and S104. However, the present disclosure is not limited to the above configuration. For example, one determination processing may be omitted. At least one determination processing may substitute for another determination processing. Another determination processing may be added. S103 and S104 have a relation of an AND condition to determine that the subject vehicle is travelling. However, S103 and S104 may have a relation of an OR condition instead. The subject vehicle may be determined as being travelling when at least one of the conditions is satisfied, that is, when either a running speed of the subject vehicle exceeds the predetermined speed V0 or the parking brake is not ON.

(4B) In the display processing, whether the subject vehicle is in the HUD operation enable state is determined based on the determination processing in S107 through S114 and S116 through S119. The present disclosure is not limited to the above configuration. For example, at least a part of the determination processing may be omitted. At least a part of the determination processing may substitute for another determination processing. Another determination processing may be added. Multiple processes of the determination processing have a relation of an AND condition to determine that the subject vehicle is in the HUD operation enable state. However, multiple processes may have a relation of an OR condition instead. For example, in the determination processing in S107 through S111, it may be required that at least one determination condition is satisfied as a necessary condition of the HUD operation enable state.

(4C) The embodiment has described the head-up display 12 as an example of the second display device. The present disclosure is not limited to this configuration. For example, a meter display, which is a display device disposed to a driver seat side (near the steering wheel) in the instrument panel to display a running speed or the like, may be used as the second display device. The present embodiment describes the center display 11 disposed at the center of the instrument panel as an example of the first display device. The present disclosure is not limited to this configuration. The first display device may be any display device other than the second display device and disposed at a position at which a larger amount of sightline shift is necessary for visual confirmation while driving in comparison with the second display device. The second display device and the first display device may be a liquid crystal display, an organic EL display, a plasma display or the like, or a display device that displays a superimposed image using a transparent member like a head-up display.

(4D) The embodiment describes the configuration in which a display screen is larger and resolution is higher in the center display 11 than in the head-up display 12 and therefore the center display 11 excels the head-up display 12 at ease of operation when operations are made while visually confirming a displayed screen (operable by a touch operation). The present disclosure is not limited to this configuration. For example, the head-up display 12 may excel the center display 11 at least one of a size of the display screen and resolution. The center display 11 may be a display device without a touch operation function.

(4E) In the above embodiment, operations using the center display 11 are not limited while the subject vehicle is at a stop (S103 and S104). The present disclosure is not limited to this configuration. For example, it may be configured in such a manner that operations using the center display 11 are not limited while the subject vehicle is at a stop as a necessary condition and when another condition is satisfied as well. In other words, it may be configured in such a manner that operations using the center display 11 are limited unless all the conditions are satisfied even when the subject vehicle is at a stop.

(4F) The above embodiment describes a curved road and a road onto which the subject vehicle is supposed to turn right or left (S116 through S119) as an example of a road on which a driving load is expected to increase. The present disclosure is not limited to the configuration above. For example, a steep road with a gradient at or above a predetermined value or a narrow road with a width at or below a predetermined value may be detected as a road on which a driving load is expected to increase.

(4G) In the embodiment, the distance used for determination is changed according to a type of road on which the subject vehicle is traveling, more specifically, whether the subject vehicle is traveling on either an expressway or a national road (S115 through S119). However, the present disclosure is not limited to the configuration above. For example, the distance used for determination may be changed according to whether the subject vehicle is traveling on either an expressway or a road (a general road) other than the expressway. Types of road may be changed according to a subject detected on the route ahead (for example, according to whether the subject detected on the route ahead is a curve road or a road onto which the subject vehicle is supposed to turn right or left).

(4H) In the above embodiment, the center screen image is not displayed on the head-up display 12 unless the center screen image is the item selection screen image even when the subject vehicle is travelling (S105). However, the present disclosure is not limited to this configuration. For example, when the center screen image is an operation screen image operated with visual confirmation, the center screen image may be displayed on the head-up display 12 regardless of whether the center screen image is the item selection screen image.

(4I) In the above embodiment, the number of displayed items is reduced in the item selection screen image displayed on the head-up display 12 (FIG. 6). The present disclosure is not limited to this configuration. For example, the image may be reduced as a whole. Character strings may be replaced with icons. When items displayed on the center display 11 are, for example, items containing both icons and character strings, one of the icons and the character strings alone may be displayed by omitting the other.

(4J) A function included in a single component in the above embodiment may be distributed to two or more components. Functions included in more than one component may be put together in a single component. A part of the configuration in the above embodiment may be replaced with a known configuration with a similar function. A part of the configuration of the above embodiment may be omitted as long as the object is achieved. At least a part of the configuration of the above embodiment may be added to or replaced with the configurations of the other embodiments. It should be noted that all modifications contained in a technical idea specified by the description of the claims are included as embodiments of the present disclosure.

(4K) In addition to the navigation ECU 20, the present disclosure can be implemented by various modes such as a program that makes a computer function as the navigation ECU 20, a medium storing the program, the vehicle display system 1, a display method, or the like.

A vehicle display processing apparatus according to one aspect of the present disclosure includes a first determination portion, a first display processing portion, and a second display processing portion.

The first determination portion determines whether a vehicle is at a stop. When the first determination portion determines that the vehicle is at a stop, the first display processing portion displays an operation screen image with which to make an operation on a first display device provided between a driver seat and a front passenger seat. When the first determination portion determines that the vehicle is not at a stop, the second display portion displays a screen relating to the operation screen image being displayed on the first display device on a second display device provided on a side of the driver seat. According to this configuration, a screen relating to the operation screen image being displayed on the first display device while the vehicle is at a stop is displayed on the second display device while the vehicle is travelling. It may be possible that a driver continues an operation (an operation to be limited by enforced traveling while the vehicle is travelling) made by the driver by visually confirming the first display device while the vehicle is at a stop relatively safely while the vehicle is travelling.

It is noted that a flowchart or the processing of the flowchart in the present application includes multiple sections (also referred to as steps), each of which is represented, for instance, as S101. Further, each step can be divided into several sub-steps while several steps can be combined into a single step.

Each or a combination of the above multiple steps can be realized not only as steps of (i) software combined with a hardware unit (for example, a computer), but also as steps of (ii) hardware (for example, an integrated circuit, a hard-wired logic circuit) while including or not including functions of related devices. Further, steps of the hardware may be formed inside a microcomputer.

While the embodiments, the configurations, and the modes according to the present disclosure are illustrated above, embodiments, configurations, and modes according to the present disclosure are not limited to the respective embodiments, the respective configurations, and the respective modes described above. For example, an embodiment, a configuration, and an aspect which are obtained by appropriately combining technical portions disclosed in different embodiments, configurations, and aspects are also included in the embodiments, the configurations, and the aspects according to the present disclosure.

The invention claimed is:

1. A vehicle display processing apparatus, comprising:
a first determination portion that determines whether a vehicle is at a stop, wherein the first determination portion determines that the vehicle is at the stop when a running speed of the vehicle is equal to or slower than a first predetermined running speed, and the first determination portion determines that the vehicle is not at the stop when a predetermined condition including a case where the running speed of the vehicle exceeds the first predetermined running speed is satisfied;
a first display processing portion that, when the first determination portion determines that the vehicle is at the stop, displays on a first display device, an operation screen image for making an operation, the first display device being provided between a driver seat and a front passenger seat;

a second display processing portion that is configured to display a screen image relating to the operation screen image, which is displayed on the first display device, on a second display device provided to a driver seat side; and a second determination portion that determines whether the running speed of the vehicle is equal to or greater than a second predetermined running speed that is greater than the first predetermined running speed, wherein:

the second display device is provided by a head-up display;

when the first determination portion determines that the vehicle is not at the stop the first display processing portion does not display the operation screen image on the first display device;

when the first determination portion determines that the vehicle is not at the stop and also when the second determination portion determines that the running speed of the vehicle is lower than the second predetermined running speed, the second display processing portion does not display the screen image relating to the operation screen image on the second display device; and when the first determination portion determines that the vehicle is not at the stop and also when the second determination portion determines that the running speed of the vehicle is equal to or greater than the second predetermined running speed, the second display processing portion displays the screen image relating to the operation screen image on the second display device.

2. The vehicle display processing apparatus according to claim 1, further comprising:

a third determination portion that determines whether acceleration of the vehicle is within a predetermined range that includes zero, wherein:

when the third determination portion determines that the acceleration of the vehicle is out of the predetermined range, the second display processing portion does not display the screen image relating to the operation screen image on the second display device.

3. The vehicle display processing apparatus according to claim 1, further comprising:

a fourth determination portion that determines whether a steering angle of a steering wheel of the vehicle is less than a predetermined angle, wherein:

when the fourth determination portion determines that the steering angle of the steering wheel of the vehicle is equal to or greater than the predetermined angle, the second display processing portion does not display the screen image relating to the operation screen image on the second display device.

4. The vehicle display processing apparatus according to claim 1, further comprising:

a fifth determination portion that determines whether a gear of the vehicle is shifting, wherein:

when the fifth determination portion determines that the gear of the vehicle is shifting, the second display processing portion does not display the screen image relating to the operation screen image on the second display device.

5. The vehicle display processing apparatus according to claim 1, further comprising:

a sixth determination portion that determines whether a turn signal of the vehicle is operating, wherein:

when the sixth determination portion determines that the turn signal of the vehicle is operating, the second display processing portion does not display the screen image relating to the operation screen image on the second display device.

6. The vehicle display processing apparatus according to claim 1, further comprising:

a seventh determination portion that determines whether a wiper of the vehicle is operating, wherein:

when the seventh determination portion determines that the wiper of the vehicle is operating, the second display processing portion does not display the screen image relating to the operation screen image on the second display device.

7. The vehicle display processing apparatus according to claim 1, further comprising:

an eighth determination portion that determines whether a rain sensor detecting a raindrop adhering onto the vehicle detects the raindrop, wherein:

when the eighth determination portion determines that the raindrop is detected, the second display processing portion does not display the screen image relating to the operation screen image on the second display device.

8. The vehicle display processing apparatus according to claim 1, further comprising:

a ninth determination portion that determines whether an obstacle detector detecting an obstacle within a predetermined range around the vehicle detects the obstacle, wherein:

when the ninth determination portion determines that the obstacle is detected, the second display processing portion does not display the screen image relating to the operation screen image on the second display device.

9. The vehicle display processing apparatus according to claim 1, further comprising:

a tenth determination portion that determines whether a curved road is detected on a route up to a predetermined first distance ahead of the vehicle, wherein:

when the tenth determination portion determines that the curved road is detected, the second display processing portion does not display the screen image relating to the operation screen image on the second display device.

10. The vehicle display processing apparatus according to claim 9, wherein:

the tenth determination portion determines a road type of a road on which the vehicle is traveling, and when the tenth determination portion determines that the vehicle is traveling on a road of a first type, the tenth determination portion sets the first distance to a longer distance in comparison with a case where the road on which the vehicle is traveling is determined as a road of a second type that is different from the road of the first type.

11. The vehicle display processing apparatus according to claim 1, further comprising:
an eleventh determination portion that determines whether a road onto which the vehicle is supposed to turn right or left is detected on a route up to a predetermined second distance ahead of the vehicle,
wherein:
when the eleventh determination portion determines that the road onto which the vehicle is supposed to turn right or left is detected,
the second display processing portion does not display the screen image relating to the operation screen image on the second display device.

12. The vehicle display processing apparatus according to claim 11, wherein:
the eleventh determination portion determines a road type of a road on which the vehicle is traveling, and
when the eleventh determination portion determines that the vehicle is traveling on a road of a third type,
the eleventh determination portion sets the second distance to a longer distance in comparison with a case where the road on which the vehicle is traveling is determined as a road of a fourth type that is different from the road of the third type.

13. The vehicle display processing apparatus according to claim 1, wherein:
the operation screen image is provided by an item selection screen image on which a plurality of items to be selected by a driver are listed; and
the second display processing portion displays a part of the items of the item selection screen image on the second display device.

14. The vehicle display processing apparatus according to claim 1, wherein:
the second display processing portion displays the operation screen image on the second display device in a display mode different from an other display mode of the first display device.

15. The vehicle display processing apparatus according to claim 1, wherein:
the second display processing portion reduces an amount of information displayed on the second display device at one time in comparison with an amount of information displayed on the first display device at one time.

16. A vehicle display processing apparatus, comprising:
a controller including:
a first determination portion that determines whether a vehicle is at a stop, wherein the first determination portion determines that the vehicle is at the stop when a running speed of the vehicle is equal to or slower than a first predetermined running speed, and the first determination portion determines that the vehicle is not at the stop when a predetermined condition including a case where the running speed of the vehicle exceeds the first predetermined running speed is satisfied;
a first display processing portion that, when the first determination portion determines that the vehicle is at the stop, displays on a first display device, an operation screen image for making an operation, the first display device being provided between a driver seat and a front passenger seat;
a second display processing portion that is configured to display a screen image relating to the operation screen image, which is displayed on the first display device, on a second display device provided to a driver seat side; and
a second determination portion that determines whether the running speed of the vehicle is equal to or greater than a second predetermined running speed that is greater than the first predetermined running speed,
wherein:
the second display device is provided by a head-up display;
when the first determination portion determines that the vehicle is not at the stop
the first display processing portion does not display the operation screen image on the first display device;
when the first determination portion determines that the vehicle is not at the stop and also when the second determination portion determines that the running speed of the vehicle is lower than the second predetermined running speed,
the second display processing portion does not display the screen image relating to the operation screen image on the second display device; and
when the first determination portion determines that the vehicle is not at the stop and also when the second determination portion determines that the running speed of the vehicle is equal to or greater than the second predetermined running speed,
the second display processing portion displays the screen image relating to the operation screen image on the second display device.

* * * * *